United States Patent [19]

Doellner

[11] 4,130,345
[45] Dec. 19, 1978

[54] OPTICAL COUPLING APPARATUS

[75] Inventor: O. Leonard Doellner, Tucson, Ariz.

[73] Assignee: The Boeing Company, Seattle, Wash.

[21] Appl. No.: 772,064

[22] Filed: Feb. 25, 1977

[51] Int. Cl.$^2$ .............................. G02B 5/14
[52] U.S. Cl. ........................ 350/96.22; 350/96.15
[58] Field of Search ............................ 350/96 C

[56] References Cited

U.S. PATENT DOCUMENTS

| | | | |
|---|---|---|---|
| 3,438,694 | 4/1969 | Reid et al. ............................ | 350/171 |
| 3,870,396 | 3/1975 | Racki et al. ..................... | 350/96 C X |
| 3,874,779 | 4/1975 | Thiel ............................ | 350/96 C X |
| 4,030,811 | 6/1977 | Khoe et al. ..................... | 350/96 C |

OTHER PUBLICATIONS

Bloem, H. H., Stigliani, Jr., D.J., "Fiber Optic Coupler" IBM Tech. Disclosure Bulletin, vol. 16, No. 1, Jun. 1973, pp. 146-147.
Lynch, R. J., "Fiber Optic Connectors" IBM Tech. Disclosure Bulletin, vol. 13, No. 2, Jul. 1970, pp. 533-534.

Primary Examiner—John K. Corbin
Assistant Examiner—Rolf Hille
Attorney, Agent, or Firm—Christensen, O'Connor, Johnson & Kindness

[57] ABSTRACT

Optical coupling apparatus for coupling a portion of the optical energy propagating through each individual optical fiber of an optical transmission system into an associated optical fiber is disclosed. The coupling apparatus utilizes a single semi-reflective beam splitting interface that is angularly disposed between associated optical fibers that form input and output sections of each individual transmission path of the optical transmission system. An optical fiber is arranged relative to the semi-reflective interface and the associated input and output fibers of each optical transmission path so as to form a plurality of optical Tee type couplers. As optical signal energy propagates from each individual input fiber, a portion of the optical energy passes through the beam splitting interface into the associated output fiber and the remaining portion is reflected from the interface into the third optical fiber. To minimize transmission loss and prevent pertubations in the optical signals propagating through the coupler apparatus, the beam splitting interface, which is alternatively a thin optical membrane known as a pellicle or is a metallic or dielectric coating, has a thickness less than that of the optical fibers with the optical fibers that form each Tee type coupler being in abutment with the beam splitting interface and in abutment with one another.

9 Claims, 9 Drawing Figures

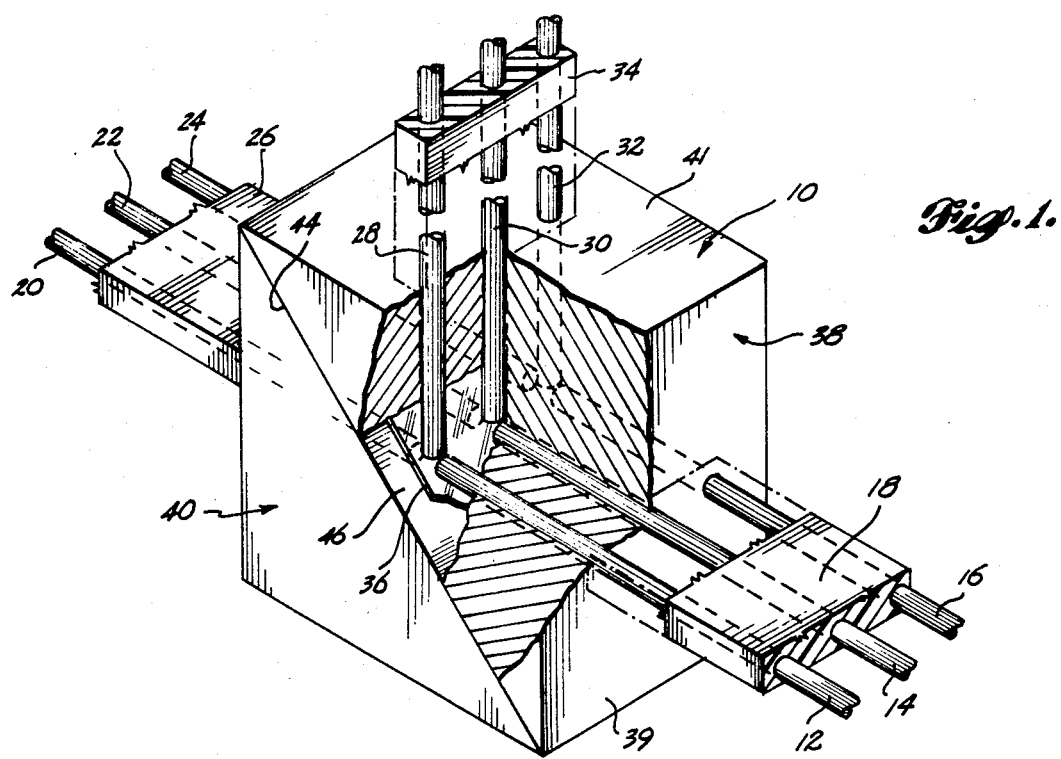
Fig. 1.
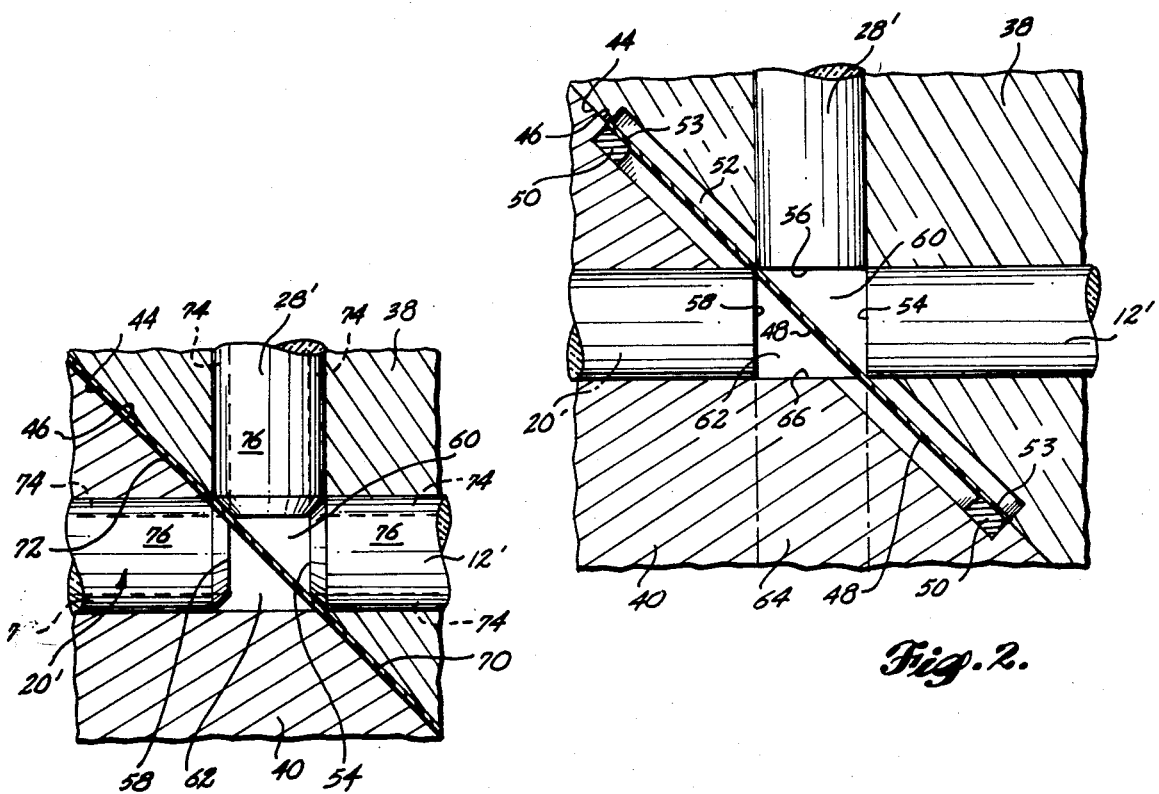
Fig. 2.
Fig. 3.

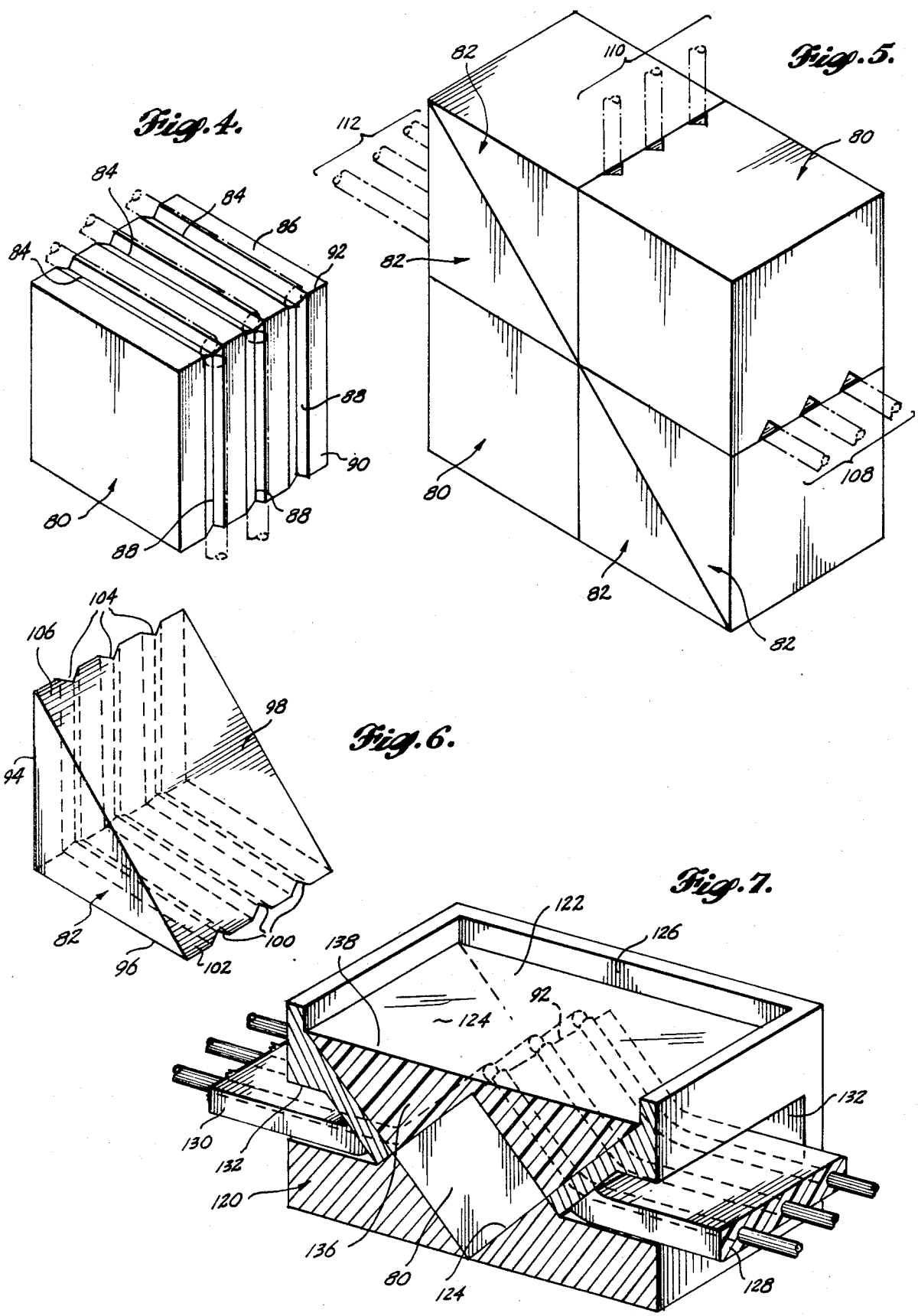

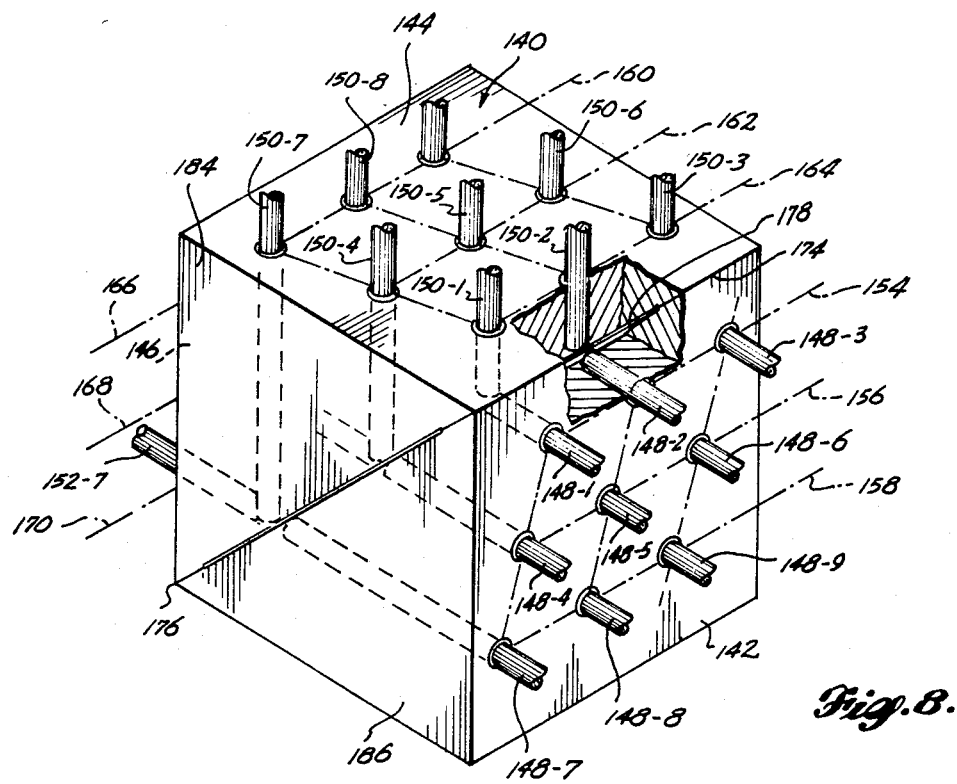

OPTICAL COUPLING APPARATUS

BACKGROUND OF THE INVENTION

In optical transmission systems wherein light energy propagates along an optical transmission path, a need often arises for coupling a portion of the optical energy to various system components that are located between the source of the optical energy and a remote terminal apparatus. For example, in an optical communications system, information — transmitted as optical energy — is carried to a remote receiver unit via one or more optical transmission lines such as optical fibers, and it is often necessary to couple the information to a plurality of individual communications units or stations located along the path of the optical transmission line.

In the prior art various apparatus for coupling a portion of the energy propagating along such optical transmission paths have been proposed. One such prior art coupler, which is relevant to this invention, is commonly identified as an optical Tee coupler. In prior art optical Tee couplers, a primary transmission path is formed by two sections of optical transmission line such as optical fibers or glass rods with the end faces of the optical transmission lines being spaced apart from one another and the longitudinal axis of the two sections being colinear. A third section of optical transmission line is positioned relative to the first and second sections to form the vertical member of a Tee-like configuration. More explicitly, the longitudinal axis of the third section of optical transmission line is coplanar with the longitudinal axes of the first and second sections and intersects the common axis of the two sections at a point between the opposing end faces of the first and second sections of optical transmission line. The end face of the third section of transmission line is spaced outwardly from the edge boundaries of the first and second transmission line sections and a beam splitter is disposed between the end faces of three sections of optical transmission line. The beam splitter divides the optical energy propagating along the first section of transmission line into two separate optical signals, with one signal passing through the beam splitter into the second section of transmission line and one signal being directed into the third section of transmission line. Thus, in effect the third section of transmission line forms a secondary transmission path to provide a portion or sample of the energy flowing through a primary transmission path that includes the first and second sections of transmission line.

The beam splitter of prior art Tee couplers are generally a plane-parallel sheet of transparent material such as glass having a semi-reflective coating on one surface, or two transparent right prisms joined together to form a cube with a partially reflecting interface disposed at a 45° angle between two opposite edges of the cube. In any case, the beam splitter is arranged to form a semi-reflective layer that passes through the intersection of the longitudinal axis of the three sections of transmission line and is orthogonal to the coplanar sections of transmission line. The semi-reflective layer of such prior art optical Tee coupler can be a partially reflective mirrored surface or a sheet of transparent material having a lower refractive index than that of the material surrounding the semi-reflective sheet (e.g., air, glass rods or prisms used to transmit the optical energy between the end faces of the transmission line sections and the surface of the beam splitter, or a fluid or gel known as index matching fluid that has a predetermined refractive index). As optical energy propagates from the end face of the first section of transmission line, the energy travels to the semi-reflective layer, a portion of the optical energy passes through the layer and propagates into the face of the second section of transmission line, and a portion of the optical energy is reflected from the partially reflective layer into the end face of the third optical transmission line.

Although such prior art Tee couplers have proven satisfactory in applications wherein optical energy is transmitted primarily for illuminating a spatial region at the terminus of each optical path, such arrangements have several drawbacks in apparatus such as optical communication systems wherein minimum perturbation of the light propagating through the communication system and the minimum loss of optical energy is of prime importance. With respect to the perturbation of the optical energy in prior art optical Tee couplers, both the optical energy propagating through the coupler into the primary transmission line and that portion of the optical energy coupled from the primary transmission path into the secondary transmission path undergo undesirable perturbations. One cause of such perturbations that applies to both the optical energy reflected into the secondary transmission path and the optical energy propagating through the coupler into the primary transmission path arises because the refractive index of prior art beam splitters is a function of the frequency of the optical energy. Since both the angle of reflection and the angle at which the unreflected optical energy is refracted while traveling through the beam splitter are dependent on the refractive index of the beam splitter material, it can be recognized that each frequency component of the optical energy is subjected to varying amounts of reflection and refraction. This characteristic of prior art couplers is especially detrimental in multimode optical transmission systems wherein the optical signal of interest includes a number of frequency components within a particular band or region of the optical spectrum. Further, since the optical path through the beam splitter of the prior art couplers is relatively long with respect to the wavelength of the optical energy and such prior art beam splitters include at least two surfaces at which reflections occur, each ray of light impinging on the beam splitter and propagating therethrough can be reflected several times. If energy from all such reflections reaches the secondary transmission path, the optical energy coupled from the third section of transmission line will not faithfully correspond to the signal propagating into the first section of transmission line. That is, considering a single ray of optical energy propagating from the first section of transmission line and impinging on a prior art beam splitter, such as a relatively thick planar-parallel glass sheet, it can be recognized that a portion of such energy is reflected at the first surface of the glass sheet and a portion of the energy transmitted through the glass sheet is also reflected as the energy propagates from the beam splitter toward the second section of transmission line. Since both reflections will be directed toward the secondary optical transmission path, in effect, the secondary path receives two separate signals representing the same information, but separated from one another in both time and space. This phenomena results in a condition commonly referred to as "ghost images" and can greatly increase the problems associated with extracting the information contained in the optical energy that propagates along the third section of transmission line.

The refraction of the optical energy traveling through the beam splitter also causes problems with respect to the optical energy transmitted through the beam splitter and into the second transmission line, i.e. the optical energy flowing through the primary transmission path. In this respect, since the refractive index of the prior art beam splitters is generally lower than the refractive index of the optical paths (or of the material surrounding the beam splitter), a beam of light energy effectively diverges as it passes through the beam splitter causing refractive errors in the optical signal propagating along the primary transmission line. Although there have been attempts within the prior art to compensate for the above-described perturbations of the optical signals, these attempts have generally comprised the addition of optical elements which complicate the coupler structure without providing totally satisfactory results.

With respect to the efficiency of prior art couplers, it can be recognized that, because of the relatively thick prior art beam splitter and other geometric considerations, the end faces of the optical transmission lines are separated from one another by a relatively large distance. As is known in the art, when optical energy is radiated from the end face of an optical transmission line such as a glass rod or optical fiber, the energy forms a diverging beam having a divergence angle proportional to the numerical aperture of the optical transmission line. Such divergence effectively causes a decrease in the energy density of the optical waves propagating through the beam splitter and toward the end face of the second section of transmission line. Hence, unless the cross-sectional area of the second transmission line is substantially larger than the cross-sectional area of the first transmission line to thereby intercept essentially all of the optical energy, or unless other means are employed to at least partially eliminate the divergence, considerable energy loss will occur within a prior art coupler.

In view of the above-described geometric considerations, it can be recognized that problems which effect undesirable perturbations in the optical energy and undesirable decreases in coupler efficiency become more acute in couplers necessarily employing optical transmission lines of relatively small cross-sectional area. In this respect, present day circular multimode optical fibers commonly have a diameter on the order of 0.003 to 0.005 inches while single mode optical fibers can have a diameter less than 10 microns. Accordingly, much of the prior art, although suitable for use with relatively large optical transmission lines such as glass rods, is not suited for use in systems employing such miniature optical fibers. Additionally, in many instances an optical transmission system includes a relatively large number of individual optical fibers which are arranged within a fiberoptic cable with each optical fiber carrying separate information. In such installations, it is often necessary to couple a portion of the optical energy propagating through each of the individual fibers into associated optical transmission lines. Since prior art optical Tee couplers for coupling a portion of the optical energy flowing through a single optical transmission line are relatively large, it can be realized that a large number of such prior art couplers for coupling energy from each optical transmission line is not a desirable approach to such a problem.

Accordingly, it is an object of this invention to provide optical coupling apparatus of improved efficiency wherein minimum perturbation occurs in the optical energy propagating through the coupling apparatus.

Further, it is an object of this invention to provide a relatively small optical coupler of simple construction wherein optical energy is coupled from each optical path of a fiberoptic cable.

SUMMARY OF THE INVENTION

These and other objects are achieved in accordance with this invention by an optical coupler which includes a single semi-reflective interlayer disposed between the optical fibers of three sections of fiberoptic cable. The three fiberoptic cables form input and output sections of each optical path in the primary transmission paths of an optical transmission system and a secondary output section for coupling a portion of the optical energy flowing through each primary path into a desired system component.

In each embodiment of the invention, the optical fibers of the input section and the secondary output section are arranged within a first support body with the individual fibers of each of the two sections of fiberoptic cable being coplanar and mutually parallel with other fibers of that particular cable. Each fiber within the fiberoptic cable that forms the input section is associated with a particular optical fiber within the secondary output section with a first portion of the boundaries that form the end faces of each of the associated fibers being in abutment with one another and a second portion of the edge face boundaries of each associated optical fiber pair being in abutment with a planar surface of the first support body. Preferably, each of the optical fibers has an end face that is substantially orthogonal to the longitudinal axis of the fiber and the coplanar optical fibers of the input section extend orthogonally relative to the coplanar optical fibers of the secondary output section such that the end faces of two associated fibers are tangential to one another and tangential to the planar surface of the first support body.

The optical fibers of the third fiberoptic cable, which forms the primary transmission line output section, are arranged within a second support body to form a coplanar, spaced apart, mutually parallel array of a geometry similar to the arrangement of the optical fibers of the first and second fiberoptic cables. In particular, the optical fibers of the third fiberoptic cable extend into the second support body and terminate at a planar surface thereof with the optical fibers being arranged such that the first and second support bodies can be joined together to associate each optical fiber of the third fiberoptic cable in an optical Tee arrangement with a pair of optical fibers formed within the first support body by the fiberoptic cables that form the input section and primary output section. When the first and second support bodies are joined together, the end face of each optical fiber within the third fiberoptic cable is in alignment with and spaced apart from the end face of an associated optical fiber of the first fiberoptic cable by a distance on the order of the thickness of the optical fibers employed.

In some embodiments of the invention, the semi-reflective interlayer is a thin transparent membrane known as a pellicle that is mounted along the interface that is formed between the planar surfaces of the joined together first and second support bodies. Hence, the pellicle is angularly interposed between the input and output optical fibers of each Tee-like arrangement of optical fibers. In these embodiments, the pellicle, which can be on the order of two microns thick, can include a metallic or dielectric coating on one surface thereof to control the amount of energy that is coupled to the secondary transmission line, or can be an uncoated transparent material having a refractive index less than the refractive index of the optical fibers.

In other embodiments of the invention, the planar surface of either the first or second support body includes a layer of transparent material such as a resin having a refractive index substantially equal to or greater than the refractive index of the optical fibers. A thin, semi-reflective coating, generally having a thickness of less than 10,000 Angstrom units is deposited on the transparent layer and the two support bodies are bonded together by a second layer of the transparent material. Since the thickness dimension of either type of semi-reflective interface is relatively small with respect to the thickness of the optical fibers and the end faces of the optical fibers are located close to one another (e.g., with a separation approximately equal to the fiber thickness), little perturbation occurs in the optical signals coupled through the primary and secondary transmission paths and little energy is lost in the coupling process.

Additionally, various arrangements are disclosed for forming the embodiments of this invention. In one embodiment, the first and second support bodies are each formed by a single rectangular support block and two wedge shaped support blocks that are joined together to form a pentahedron having two oppositely disposed right triangular faces and three rectangular faces. The optical fibers of the fiberoptic input cable and the fiberoptic secondary output cable are positioned in a series of parallel grooves that are included on two orthogonally oriented faces of the rectangular support block and a wedge shaped support block is joined to each of the grooved faces to form the first support body. To form the second support body, the optical fibers of the fiberoptic cable that forms the output section of the primary transmission paths are mounted in appropriate grooves of a rectangular support block and a wedge-like support block is joined to each grooved face of the rectangular support block. The first and second support bodies are then joined together with a semi-reflective pellicle interposed between them or a thin semi-reflective coating is deposited on the planar surface of one of the support bodies.

In a second embodiment, the optical fibers are placed in the grooves of a rectangular support block that is positioned within a central opening of a mold. The central opening is of an upward opening V-shape that corresponds to the shape of the first and second support bodies. During the molding process, the rectangular block rests in the opening with the end faces of the optical fibers positioned near the upper surface of the mold opening. A transparent casting resin, having a suitable refractive index, is placed in the mold opening and, if necessary, the upper surface is machined to an optical finish after the resin has cured. Two molded parts having the necessary arrangements of optical fibers are then joined together with a pellicle or semi-reflective coating being interposed between the optical fibers in the previous described arrangement.

In yet another embodiment of the invention, a three dimensional array of optical Tee couplers is formed by a semi-reflective interlayer that is angularly disposed within a support cube or support body of other geometric shape. When a support body having the shape of a cube or rectangular solid is employed, two sets of small openings, dimensioned for receiving the optical fibers, are formed in the support body. The first set of openings is preferably arranged in rows of openings that pass completely through the support body with the walls of the openings being parallel to one another and perpendicular to the oppositely disposed faces of the support body that include the first set of openings. A second set of openings is formed in a third face of the support body with each opening of the second set being positioned to intersect a single opening of the first set of openings at a point coincident with a plane angularly disposed between two diagonally opposed edges of the support body. The support body is then sliced along this diagonal plane and optical fibers are inserted in each of the openings with the end face of each optical fiber being tangential to the diagonal face. The support body is then rejoined along the diagonal faces of each portion with a pellicle or semi-reflective coating being interposed between the end faces of the optical fibers such that an optical Tee coupler is formed at each point where three optical fibers abut the semi-reflective layer.

BRIEF DESCRIPTION OF THE DRAWINGS

A better understanding of the present invention can be derived by reading the ensuing specification in conjunction with the accompanying drawings wherein:

FIG. 1 is a partially cutaway isometric view of an optical coupler constructed in accordance with this invention;

FIGS. 2 and 3 are cross-sectional views depicting alternative pellicle mounting and optical fiber arrangements which can be utilized in the practice of this invention;

FIGS. 4, 5 and 6 are isometric views depicting an embodiment of this invention wherein the support blocks of FIGS. 4 and 6 are joined together to form the coupler embodiment depicted in FIG. 5;

FIG. 7 is an isometric view depicting a mold for forming an embodiment of this invention wherein optical fibers and a support block of FIG. 4 are molded to form an optical coupler;

FIG. 8 is an isometric view of an embodiment of this invention arranged to form a three-dimensional array of optical couplers within a single support body; and FIG. 9 is a cross-sectional view of the embodiment of the invention depicted in FIG. 8.

DETAILED DESCRIPTION

FIG. 1 depicts the basic structre of an optical coupler 10 constructed in accordance with this invention for coupling a portion of the optical energy propagating along each primary optical transmission path of an optical transmission system into an associated secondary optical transmission path. More explicitly, optical energy propagating along each optical fiber 12, 14 and 16 of a fiberoptic cable 18 is coupled to a corresponding optical fiber 20, 22 and 24 of a fiberoptic cable 26 with a portion of the energy propagating through the optical fibers 12, 14 and 16 being respectively coupled to optical fibers 28, 30 and 32 of a fiberoptic cable 34. As shall be described in more detail hereinafter, a thin beam splitter 36, which is interposed between the optical fibers of the fiberoptic cables 18, 26 and 34, causes a portion of the optical energy propagated outwardly from the terminus of each optical fiber 12, 14 and 16 of the optical cable 18 to be reflected into the associated optical fibers 28, 30 and 32 of the fiberoptic cable 34 while simultaneously permitting the remaining portion of the energy propagating from the fibers of the fiberoptic cable 18 to pass directly into the associated optical fibers 20, 22 and 24 of the fiberoptic cable 26.

Each fiberoptic cable 18, 26 and 34 depicted in FIG. 1 is a type of transmission line commonly identified as a fiber ribbon optical transmission line wherein a plurality of optical fibers (e.g., optical fibers 12, 14 and 16) are encased in a sheath material with the fibers being mutually parallel and spaced apart from one another. Upon understanding this invention, it will be recognized that although each disclosed embodiment is particularly suited for use in optical transmission systems employing such ribbon type optical transmission lines, other types of fiberoptic cables can be employed.

Each optical fiber 12, 14 and 16 of the fiberoptic cable 18 and each optical fiber 28, 30 and 32 of the fiberoptic cable 34 is rigidly supported within a first support body 38 to effectively form one half of the optical coupler 10. In particular, the optical fibers of each fiberoptic cable 18 and 34 are arranged in a coplanar or linear array with the optical fibers of each fiberoptic cable 18 and 34 being substantially parallel to one another and spaced apart by a predetermined distance. For example, in the depicted embodiment of the invention, the optical fibers 12, 14 and 16 extend inwardly from a first face 39 of the first support body 38 with the fibers 12, 14 and 16 mutually parallel and spaced apart from one another. The fibers 28, 30, and 32 of the fiberoptic cable 34 extend inwardly from a second face 41 of the first support body 38 that is orthogonal to the face 39 with the fibers 28, 30 and 32 being mutually parallel and spaced apart from one another in the same manner as the fibers 12, 14 and 16 of the fiberoptic cable 18. In addition, the first support body 38 maintains each optical fiber of the fiberoptic cable 18 in a coplanar orientation with an associated optical fiber of the fiberoptic cable 34. For example, the optical fiber 12 of the fiberoptic cable 18 and the optical fiber 28 of the fiberoptic cable 34 are retained within the first support body 38 such that the axial centerlines of the optical fibers 12 and 28 are coplanar with one another with the terminus or end face of each optical fiber 12 and 28 being in abutment with one another and in abutment with an angularly disposed surface 44 of the first support body 38 that either includes or supports the beam splitter 36.

The fiberoptic cable 26 is retained within a second support body 40 with the optical fibers 20, 22 and 24 mutually parallel to one another and spaced apart from one another by the same distance as the spacing between the fibers 12,14 and 16 of the optical cable 18. Further, the optical fibers 20, 22 and 24 of the optical cable 26 terminate at an angularly disposed planar surface 46 of the second support body 40. The surfaces 44 and 46 of the first and second support bodies 38 and 40 are arranged for assembly with one another in a mutually contacting orientation with the fibers 20, 22 and 24 of the fiberoptic cable 26 being arranged within the second support body 40 such that the linear array formed by the fibers 20, 22 and 24 is coplanar with the linear array formed by the fibers 12, 14 and 16. In particular, when the first support body 38 is joined to the second support body 40, each optical fiber of the fiberoptic cable 18 is in optical alignment with a corresponding fiber of the fiberoptic cable 26. For example, the optical fiber 12 is colinear with and in optical alignment with the optical fiber 20, the optical fiber 14 is in optical alignment with the optical fiber 22, and the optical fiber 16 is in optical alignment with the optical fiber 24.

In accordance with this invention, the beam splitter 36 is alternatively a thin optical membrane known as a pellicle, which is mounted along the interface formed by the diagonal face 46 of the second support body 40, or is a thin beam-splitting coating that is applied directly to one of the planar surfaces 44 and 46. In either case, the beam splitter 36 is a thin optical element which transmits a portion of an incident light beam and reflects the remaining portion. In particular, light energy propagating along the fibers 12, 14 and 16 of the fiberoptic cable 18 emerges from the ends of the optical fibers and impinges on the surface of the beam splitter 36 as a substantially collimated beam of light. A portion of the light energy is reflected upward to impinge on the ends of the associated optical fibers 28, 30 and 32 of the fiberoptic cable 34, and the remaining portion of the light energy passes through the beam splitter 36 to propagate along the optical fibers 20, 22 and 24 of the fiberoptic cable 26. Thus it can be recognized that the embodiment of FIG. 1 is arranged to form an optical Tee coupler in each transmission path of an optical transmission system.

FIGS. 2 and 3 illustrate two satisfactory arrangements for the mounting of a pellicle to form the beam splitter 36 of FIG. 1. In FIG. 2, a pellicle 48 is mounted on an optically flat pellicle frame 50 and supported within a cavity 52 formed in the abutting planar surfaces 44 and 46 of the first and second support bodies 38 and 40. The pellicle 48 is a thin elastic, transparent membrane that is commonly constructed of cellulose nitrate. The pellicle frame 50 can be annular or rectangular in shape and includes an optically flat peripheral surface 53 over which the pellicle 48 is stretched taut. Pellicles suitable for the practice of this invention are commercially available either unmounted, or mounted on frames such as pellicle frame 50, from a number of suppliers of optical apparatus. For example, pellicles as thin as two microns are available from National Photocolor Corporation of South Norwalk, Conn. Advantageously, such pellicles are available with a wide range of reflection-transmission ratios to allow a predetermined portion of the optical energy emerging from the optical fiber 12' of FIG. 2 to be reflected into the optical fiber 28' while the remaining portion of the optical energy propagates directly through the pellicle 48 and into the optical fiber 20'. In FIG. 2, the optical fibers 12', 20' and 28' typify the structural arrangement of the fiberoptic cables 18, 26 and 34 of FIG. 1.

As previously described relative to FIG. 1, optical fibers retained within the first support body 38 are maintained within the support body 38 such that a portion of the end face of optical fibers 12' and 28' each contact the beam splitter, i.e., pellicle 48, with the end faces 54 and 56 of the fibers 12' and 28' also abutting one another. In a similar manner, the fiber 20' is retained within the second support body 40 such that the end face 58 of the fiber 20' contacts the second surface of the pellicle 48 with the fibers 12' and 20' being optical'y aligned with one another. Preferably, the end faces 54, 56 and 58 of the optical fiber 12' 20' and 28' are ground and finished to an optically flat surface which is orthogonal to the axial centerline of the respective optical fiber. Since the pellicle 48 has a thickness on the order of a few microns, the optical fibers 12' and 20' of the arrangement of FIG. 2 are spaced from one another by a distance substantially equal to the thickness of the fibers 12' and 20'. Because of this small spatial separation, e.g., presently available multi-mode conventional optical fibers commonly have a diameter of five mils (0.005 inches), there is little separation between the terminus of the fiber 12' and the terminus of the fiber 20'. Thus, with respect to the optical energy radiated from the terminus of the fiber 12', little divergence occurs within the region 60 that is formed between the end face 54 of fiber 12' and the pellicle 48. Similarly, that portion of the optical energy transmitted through the pellicle 48 travels substantially undistorted through the region 62, formed between the end face 58 of fiber 20' and the second surface of the pellicle 48, with substantially all of the transmitted energy being coupled into the fiber 20'. In a like manner, the energy reflected from the first surface of the pellicle 48 travels substantially undistorted through the region 60 and into the end face 56 of the optical fiberr 28'.

Although such close spacing of the optical fibers 12', 20' and 28' results in little loss of optical energy due to divergence, especially in embodiments wherein the optical fibers 12', 28' and 20' have a relatively low numerical aperture, it can be advantageous to fill the cavities formed by the spaces 60 and 62 with an index matching fluid or gel. In this respect, a conventional index matching fluid having a refractive index substantially equal to the refractive index of the optical fibers can be used, or an index matching fluid having a slightly higher refracting index than the refractive index of the fibers can be used to decrease optical divergence within the regions 60 and 62 and hence prevent the small energy loss caused by the slight divergence of the light energy emitted from the optical fiber 12'. As will be described in more detail relative to the embodiment of the invention depicted in FIG. 7, the regions 60 and 62 formed between the optical fibers and the pellicle 48 can be alternatively filled with a transparent resin having the desired refractive index.

In some embodiments of the invention, it may be advantageous to include a fourth optical fiber in each of the Tee-type couplers formed by the optical cables 18, 26 and 34 of FIG. 1. For example, in FIG. 2, a fourth optical fiber 64 is shown supported within the second support body 40. The fourth optical fiber 64 is mounted within the second support body 40 such that the optical fibers 64 and 20' are coplanar with the end face 66 of the optical fiber 64 abutting the terminus of the optical fiber 20' and the lower surface 68 of the pellicle 48. Provision of the optical fiber 64 can be advantageous for two reasons. First, such an embodiment of the invention effectively forms a four part device wherein either the optical fiber 12' or the optical fiber 64 can be utilized as the input parts. When the optical fiber 64 is used to transmit optical energy to the pellicle 48, a portion of the energy is transmitted through the pellicle 48 and into the optical fiber 28' while a portion of the energy is reflected from the lower surface 68 of the pellicle 48 and into the fiber 20'. Since, as will be explained in more detail relative to the pellicle mounting arrangement of FIG. 3, the second surface of a pellicle may be coated to exhibit a different reflection-transmission ratio than that exhibited by the first surface, such an arrangement permits a single coupler unit to be utilized in two separate applications requiring the extraction of a different amount of energy from an optical transmission system. Further, in some applications, it may be advantageous to introduce optical energy in both the optical fibers 12' and 64. In such a case, the reflected portion of the optical energy propagating through the optical fiber 12' will mix with the transmitted portion of the optical energy propagating from the end face 66 of the optical cable 64 with the mixed optical energy propagating along the optical fiber 28'. In a similar manner, the portion of the optical energy propagating from the end face 66 of the optical fiber 64 and reflected into the optical fiber 20' will be mixed with that portion of the optical energy propagating from the fiber 12' that is transmitted through the pellicle 48.

The alternative arrangement of FIG. 3 depicts a pellicle mounted directly to the planar surface 44 or 46 of the first and second support bodies 38 and 40 of FIG. 1 and further depicts an arrangement for decreasing the intervening space between the optical fibers and the pellicle when optical fibers having an outer clad region are employed. As is known in the art, often an optical fiber comprises a filamentary core surrounded by a cladding of lower refractive index. In such an optical fiber, the optical energy propagating along the core of the optical fiber is totally reflected at the core-cladding interface to prevent the radiation of optical energy outwardly through the outer boundaries of the optical fiber.

In the arrangement of FIG. 3, the planar surfaces 44 and 46 of the first and second support bodies 38 and 40 are ground and finished to an optically flat surface. A pellicle, e.g. pellicle 70 having a reflective coating 72 on one surface thereof, is then carefully bonded to one of the optical flat surfaces, e.g., surface 44 of the first support body 38. The pellicle 70 can extend over the entire optically flat planar surface to which it is bonded, or can extend only over the optically transparent regions 60 and 62 formed between the optical fibers 12', 28' and 20'. As in the case of the pellicle mounting arrangement of FIG. 2, the cavities 60 and 62 formed between the pellicle 70 and the fibers 12', 28' and 20' can be an air filled region, can be filled with an index matching fluid, or can be filled with an optically transparent resin.

In the arrangement of FIG. 3, the cavities 60 and 62 formed between the pellicle 70 and the optical fibers 12', 20' and 28' are decreased in volume to partially eliminate the small optical loss caused by divergence of the optical energy emitted from the end face 54 of the fiber 12'. In particular, the cladding layer 74 is beveled away at the terminus of each optical fiber such that the terminating face of each fiber consists soley of the core region 76. In this arrangement, the distance between the end faces 54 and 58 of the optical fibers 12' and 20' is essentially the thickness of the core region 76. Preferably the bevel angle corresponds to the angular orientation of the pellicle 70 such that the beveled surfaces of the fibers 12', 20' and 28' abut the surfaces of the pellicle 70.

The coating 72 of the pellicle 70 in FIG. 3 is a thin metallic or dielectric film which is generally vacuum deposited on one surface of the pellicle to produce a desired reflection and transmission characteristic. In this respect, thin metallic or dielectric films of various thickness and of various material can be utilized to obtain a pellicle 70 having a desired reflection-transmission ratio to control the portion of the optical energy that is coupled to the optical fiber 28' relative to the portion of optical energy that is transmitted through the pellicle and into the optical fiber 20'. More explicitly, it will be recognized by those skilled in the art that when an uncoated pellicle such as pellicle 48 of FIG. 2 is utilized, the reflection of optical energy at the surface of the pellicle 48 physically corresponds to the reflection of light energy from a smooth dielectric sheet. Thus, the portion of the optical energy radiated from the fiber 12' and reflected into the optical fiber 28' by the pellicle 48 is dependent on Fresnel's law of reflection from a plane surface. That is, the portion of the optical energy that is reflected into the fiber 28' from an uncoated pellicle (e.g. pellicle 48 of FIG. 2) is primarily dependent on the ratio between the refractive index of the material within the cavities 60 and 62 and the refractive index of pellicle 48, being further dependent upon the angle at which the light energy impinges on the surface of the pellicle 48. Since it can be shown that about 4% of the incident energy will typically be reflected from each surface of an uncoated pellicle (with air in cavities 60 and 62) and that little change in the amount of optical energy reflected occurs for an angle of incidence in the range of 30°–90°, where the angle of incidence is the angle formed between the pellicle 48 and the axial centerline of the fiber 20', it can be recognized that typical uncoated pellicles will couple approximately 8% of the optical energy into the optical fiber 28'. That is, since approximately 4% of the optical energy is reflected at each surface of the pellicle 48, and since the pellicle 48 is extremely thin, the light energy reflected from the second surface of the pellicle 48 substantially coincides with the light energy reflected from the first surface of the pellicle 48. When a coated pellicle such as the pellicle 70 of FIG. 3 is utilized, a reflective coating 72 can be selected to reflect up to approximately 80% of the incident light. Thus, it should be noted that in the practice of this invention a pellicle can be selected with or without a coating and angularly disposed between the optical fibers to couple a desired amount of the incident energy into the secondary transmission paths such as the optical fiber 28'.

When a metallically coated pellicle coated as the pellicle 70 of FIG. 3 is utilized, it should be noted that the reflection of light energy is dependent on the surface upon which the light energy impinges. That is, since Fresnel's equations for reflection from a plane surface demonstrate that the amount of reflected energy depends on the ratio of the refractive indices of the two medias separated by the surface, and because of energy absorption in metallic films more energy is reflected when the light energy is incident on the coated surface, than is reflected when the light energy is incident on the uncoated surface. Thus, a different amount of energy is reflected into the optical fiber 28' when the uncoated surface of the pellicle 70 faces the optical fiber 12' than is reflected into the optical fiber 28' when the coating 72 faces the optical fiber 12'. Accordingly, it can be recognized that a pellicle 70 can be mounted either with the coated or uncoated surface facing the optical fiber through which the optical energy emerges to in part control the amount of optical energy coupled to the optical fiber 28'. Further, it can be recognized that when a coated pellicle such as pellicle 70 is utilized in an embodiment of the invention having a fourth optical fiber such as the optical fiber 64 of FIG. 2, the difference in reflection at the two surfaces of the pellicle 70 can be utilized to provide an optical coupler than can be used in an optical transmission system to extract either a first or a second portion of the optical energy traveling through the transmission system. In particular, when the optical energy propagates through the fiber 12' a first portion of the optical energy impinging on the uncoated surface of the pellicle 70 is directed to the optical fiber 28' and when the optical energy propagates along the optical fiber 20', a second amount of optical energy is reflected into the fourth optical fiber (i.e., optical fiber 64, FIG. 2). Thus, in an embodiment of the invention wherein associated fibers of four optical cables abut a coated pellicle, either of two different reflection characteristics can be achieved by suitably connecting the optical coupler.

FIGS. 4, 5, and 6 depict an embodiment of this invention wherein the optical fibers of three fiberoptic cables are assembled with two types of support blocks to effect an optical coupler such as the coupler 10 of FIG. 1. More explicitly, as depicted in FIG. 5, two identical rectangular support blocks (FIG. 4) are assembled with four identical wedge-like support blocks (FIG. 6) to maintain a beam splitting element and a plurality of optical fibers in the previously described orientation.

The rectangular support blocks 80, which are most clearly depicted in FIG. 4, have a length and height dimension substantially equal to one half the length and height of the assembled coupler unit (FIG. 6). A series of mutually parallel, spaced apart V-shaped grooves 84 are included in an upper face 86 of the rectangular support block 80 (relative to the orientation depicted in FIG. 4) and a series of mutually parallel, spaced apart V-shaped grooves 88 are included in a vertical face 90 which intersects with the upper face 86 along an edge 92. Each groove 84 and 88 is substantially perpendicular to the edge 92 with the centerline of corresponding grooves 84 and 88 being coincident at the edge 92. As is illustrated in phantom lines in FIG. 4, the grooves 84 and 88 are each dimensioned for receiving an optical fiber with the grooves being positioned to maintain the inserted optical fibers in the orientation described relative to the embodiment of FIG. 1. In particular, each optical fiber is placed in a groove 84 or 88 with the fiber terminus coincident with and projecting orthogonally from the edge 92.

As is shown in FIG. 5, and as is more clearly shown in FIG. 6, each wedge shaped support block 82 is substantially triangular in shape having a vertical edge 94 of a length substantially equal to the height of the support block 80 and horizontal edge 96 of a length substantially identical to the longitudinal dimension of the support block 80. The angularly disposed surface 98 of each support block 82 is relatively flat and forms complementary acute angles at the intersection with the edges 94 and 96. Thus, as is shown in FIG. 5, two support blocks 82 can be placed with the surfaces 98 thereof in contact with one another and the edges 94 oppositely disposed to form a rectangular solid of the same exterior dimensions as a support block 80.

A series of grooves 100 can be included in the horizontal face 102 of the support block 82 and a series of grooves 104 can be included in the vertical face 106 of the support block 82 with the grooves 100 and 104 being positioned and dimensioned for mating with the optical fibers placed in the grooves 84 and 88 of support block 80. Such grooves 100 and 104 may be desired or necessary in embodiments of the invention wherein optical fibers having a substantial thickness are utilized (e.g., relatively large diameter multimode optical fibers), yet may not be necessary or desirable in embodiments utilizing extremely small optical fibers (e.g., single mode optical fibers) wherein proper optical alignment can be achieved by dimensioning the grooves 84 and 88 of the support block 80 to fully contain the optical fibers. In either case, if desired or necessary, the optical fibers can be bonded in place within the grooves 84 and 86 by a suitable bonding agent or resin.

Both the support blocks 80 and 82 are generally constructed of glass or a plastic material and are formed by conventional manufacturing techniques such an injection molding. As can be seen by comparing the embodiment of FIG. 5 with the embodiment of FIG. 1, a single rectangular support body 80 is joined with two wedge shaped support bodies 82 to contain the necessary fibers and form structural elements equivalent to the first and second support bodies 38 and 40 of FIG. 1. More explicitly, as shown in FIG. 5, a support body corresponding to the first support body 38 of FIG. 1 is effected by inserting the fibers of two optical cables 108 and 110 in the grooves 84 and 88 of a rectangular support body 80, joining the surface 106 of a wedge shaped support body 82 to the surface 86 of the support body 80 such that the surface 102 of the support body 82 is substantially coplanar with the surface of the support body 80, and joining the surface 102 of a second wedge shaped support body 82 to the surface 90 of the support body 80 such that the surface 94 of the second support body 82 is substantially coplanar with the surface of the support body 80. A support body corresponding to the second support body 40 of FIG. 1 is effected in a similar manner with the optical fibers of the third optical cable 112 being pressed into the grooves 84 of the support body 80 and wedge shaped support bodies 82 being joined to the surfaces 86 and 90 of the support body 80. Joining the support bodies 80 and 82 in the above-described orientation can be accomplished by a number of conventional techniques. For example, the support bodies can be joined together by a resinous cement or, in the case of plastic materials, ultrasonically welded along the exterior interfaces of the respective support bodies.

In any case, once the support bodies 80 and 82 have been joined together with the optical cables 108, 110 and 112 to form support bodies corresponding to the first and second support bodies 38 and 40 of FIG. 1, a beam splitting interlayer or pellicle is formed along the diagonal interface of the first and second support bodies as described relative to FIGS. 1, 2 and 3. When the interlayer has been formed, the two support bodies are joined together with the angularly disposed surfaces in contact with one another and the optical fibers of the fiberoptic cable 108 in alignment with the corresponding optical fibers of the fiberoptic cable 112. One advantageous method of ensuring that the respective optical fibers of the cables 108 and 112 are in proper optical alignment is to introduce light energy in the optical fibers of fiberoptic cable 108 and position the two support blocks such that a maximum amount of light is received by each optical fiber of the cable 112. As previously described relative to the embodiment of FIG. 1, the space formed between the terminus of each optical fiber and the pellicle can be filled with an index matching fluid, a transparent resin having a desired refractive index, or can be left open.

FIG. 7 depicts a mold 120 useful in forming an embodiment of this invention wherein a beam splitting coating is applied directly to one surface of a coupler support member. In FIG. 7, the mold 120 includes a central opening 122 dimensioned for forming one half of an optical coupler such as the embodiment of the invention depicted in FIGS. 1 and 5. In particular, the opening 122 is formed by two downwardly extending walls 124 that orthogonally intersect one another along the central region of the mold 120 with the V-shaped opening formed by the walls 124 being bounded by vertical end walls 126. The opening 122 is dimensioned such that a rectangular support block 80 (FIG. 4) can be placed in the opening 122 with the edge 92 of the support block 80 extending substantially perpendicular to the end walls 126. Generally, the mold 120 is constructed in two pieces, such that fiberoptic cables 128 and 130 can be easily inserted in recesses 132 that are formed adjacent each downwardly extending wall 124. A series of openings permit the optical fibers of the cables 128 and 130 to pass through the walls 124 for placement in the grooves 84 and 88 of the support block 80.

With the support block 80 positioned in the mold 120, and the optical fibers of the cables 128 and 130 positioned in the grooves 84 and 88, the central opening 122 of the mold 120 is filled with a liquid polymer or resin 136 until the surface of the polymer or resin is coincident with or slightly above the end faces of the optical fibers of the cables 128 and 130. When the resin 136 has been cured by a method appropriate for the type of resin being employed, the cast structure is removed from the mold 120 and, if necessary, the angularly disposed surface 138 is finished to an optical flatness. A thin layer of semireflective material is then deposited directly on the surface 138. For example, a metallic coating of aluminum or silver or a dielectric coating of silicon dioxide/titanium dioxide wherein the coating has a thickness generally less than 10,000 Angstrom units can be vacuum deposited upon the surface 138. As is known in the art, both the type of material employed for the coating and the thickness of the coating determine the reflection and transmission characteristics of the coating and hence such materials can be selected and controlled to provide a desired reflection-transmission ratio such as the reflection-transmission ratio of the previously described pellicles.

To form the second half of the coupler, e.g., a support body and an optical cable arrangement such as that of the second support body 40 and optical cable 26 of FIG. 1, a second support block 80 is placed in the central opening 122 of the mold 120, an optical cable is placed in the appropriate recess 132 with the optical fibers thereof being inserted through the wall 125 and into the grooves 84 and 88 of the support block 80, and the central opening 122 of the mold 120 is filled with the liquid polymer or resin 136. The two coupler halves constructed in this manner are then joined in the same manner as the assembled support bodies 80 and 82 of the embodiment in FIG. 6. Preferably, the support bodies formed in accordance with the embodiment of the invention depicted in FIG. 7 are joined with the same type of resin or liquid polymer which is utilized to form the coupler halves.

FIGS. 8 and 9 depict an embodiment of the invention in which a single semi-reflective interlayer is utilized to form a three-dimensional array of optical Tee couplers. In the depicted arrangement, the coupler 140 is shaped as a rectangular solid or cube with rows of optical fibers entering three faces of the optical coupler 140 such that individual optical fibers entering each of the three faces form a coplanar Tee arrangement at a semi-reflective interlayer formed along the plane that is angularly disposed between diagonally opposed edges of the coupler 140.

In the embodiment of FIGS. 8 and 9, the faces 142, 144 and 146 of the coupler 140 include a first, second and third set of optical fibers 148, 150 and 152. The first set of optical fibers 148 is arranged in three spaced apart, parallel rows 154, 156 and 158. In a similar fashion, the second set of optical fibers 150 is arranged in three rows 160, 162 and 164 and the third set of optical fibers 152 is arranged in three rows 166, 168 and 170. The optical fibers within each row are parallel to and spaced apart from adjoining optical fibers within that row with the spacing between adjacent fibers generally being identical within each of the rows. In particular, the rows 154, 156 and 158, which enter face 142, are respectively coplanar with the rows 166, 168 and 170, which enter the face 146. Further, each optical fiber within a particular row of the face 142 is colinear with an associated optical fiber entering the face 146. For example, as is most clearly depicted in FIG. 9, the optical fibers 148-1, 148-4 and 148-7, each of which enter the face 142 and are respectively located in the rows 154, 156 and 158, are colinear with optical fibers 152-1, 152-4 and 152-7, each of which enter the face 146 and are respectively located in the rows 166, 168 and 170. The end face of each fiber, which is preferably orthogonal to the axial center line of the fiber, is tangential to a diagonal interface or plane 172 that is angularly disposed between diagonally opposed edges 174 and 176 of the coupler 140. As in the previously described embodiments of the invention, the end faces of associated fibers 162 and 148 (e.g., fibers 152-1 and 148-1), preferably are substantially parallel to one another and spaced apart by a distance substantially equal to the thickness of the fibers to thereby form primary optical transmission paths wherein optical energy propagating through each optical fiber 152 is coupled to a corresponding optical fiber 148.

To form the secondary optical paths, each fiber within the rows 160, 162 and 164 are substantially orthogonal to the coplanar fibers that form the rows in the faces 142 and 146. More explicitly, each optical fiber 150 is positioned within the coupler 140 such that the fiber end face is substantially tangential to a corresponding fiber 152 and the diagonal interface 172. For example, as can be seen in FIG. 9, the end faces of the optical fibers 150-1, 150-4 and 150-7 are in abutment with corresponding optical fibers 152-1, 152-4 and 152-7 and also are in abutment with the diagonal interface 172.

As in the previously described embodiments of the invention, a semi-reflective interlayer 178 is angularly disposed between the end faces of each T-like arrangement of optical fibers. As previously described, the semi-reflective interlayer 178 can be formed as a pellicle or can be a metallic or dielectric coating deposited directly on the surface of the coupler 140. Further, as previously described, the openings or cavities 180 and 182 that are formed between the end faces of the optical fibers and the semi-reflective interlayer can be air filled, can be filled with an index matching fluid, or can be filled with a transparent encapsulant material having a desired refractive index.

The embodiment of the invention depicted in FIGS. 8 and 9 can advantageously be formed from a solid rectangular block or cube of material such as plastic by first forming a series of holes between the faces 142 and 146 for receiving the optical fibers 148 and 152. Holes for receiving the optical fibers 150 are then formed in the face 144 with the holes projecting downwardly at least to the diagonal plane 172 between the support edges 174 and 176. The plastic material is then sliced along the diagonal 172 with a very fine saw or other machining apparatus to divide the support block into upper and lower halves 184 and 186. The diagonal surfaces of each half of the support block are then machined smooth and the optical fibers 148, 150 and 152 are inserted in the appropriate holes. The optical fibers can be positioned, for example, by placing a coupler half 184 or 186 under a microscope and positioning a sheet of glass or other transparent material across the diagonal face of the coupler half 184 or 186 and bonding the optical fibers 148, 150 and 152 in the appropriate holes with the end face of the fibers abutting the lower surface of the transparent sheet. With the optical fibers properly bonded to the coupler halves 184 and 186, a pellicle can be positioned along the diagonal face of the upper coupler half or the lower coupler half 186 as previously described relative to the embodiment of FIG. 1. Alternatively, the diagonal faces of the upper coupler half 184 and 186 can be coated with a transparent resin, machined to an optically flat surface, and coated with a thin metallic or dielectric layer which forms a semi-reflective surface as described relative to the embodiment of FIG. 7. When the semi-reflective interlayer has been formed by use of a pellicle or the semi-reflective coating, the upper support half 184 is joined to the lower support half 186 with the optical fibers 148 in alignment with each of the optical fibers 152.

It will be recognized by those skilled in the art that the embodiments of this invention disclosed herein are exemplary in nature and that variations therein can be made without departing from the scope and the spirit of this invention. For example, although each disclosed embodiment depicts the semi-reflective interlayer as being disposed at an angle substantially equal to 45°, the invention encompasses thin semi-reflective interlayers disposed at other angles. Further, although the fibers of each disclosed embodiment extend from the coupler support bodies as parallel linear arrays such as those of a ribbon type fiberoptic cable, the fiberoptic cables can be of circular or other cross-sectional geometry with the individual fibers being suitably arranged or "fanned out" for entering the support bodies in the above-described orientation.

What is claimed is:

1. A fiber optic Tee coupler comprising:
first, second and third optical transmission cables each including a plurality of individual optical fibers;
a first support body having at least one planar face, said first and third optical transmission cable being fixedly embedded in said first support body with each individual optical fiber of each of said first and third optical transmission cables being substantially coplanar with and axially parallel to each other optical fiber within that same optical transmission cable, each said individual optical fiber of said first optical transmission cable being substantially coplanar and substantially orthogonal to an associated optical fiber of said third optical transmission cable with a first portion of the terminating end face of each optical fiber of said first and third optical transmission cables being substantially coincident with said planar face of said first support body and a second portion of the terminating end face of each of said optical fibers of said first optical transmission cable being in substantial contact with a portion of the terminating end face of said associated coplanar optical fiber of said third optical transmission cable;

a second support body having at least one planar face, said second optical transmission cable being fixedly embedded in said second support body with said individual optical fibers of said second optical transmission cable being substantially coplanar and substantially axially parallel with one another, at least a portion of the terminating end face of each of said individual optical fibers of said second optical transmission cable being substantially coincident with said planar face of said second support body, said first and second support bodies being configured and arranged for affixing said first support body to said second support body with said planar surfaces of said first and second support bodies in juxtaposition with one another to position each of said individual optical fibers within said second optical transmission cable in substantial optical and axial alignment with an associated individual optical fiber of said first optical transmission cable; and a semi-reflective interlayer disposed between said planar surfaces of said first and second support bodies, said interlayer being positioned and arranged for substantial contact with said portions of said end faces of each individual optical fiber of said first, second and third optical transmission cables that are substantially coincident with said planar surfaces of said first and second support bodies, said semi-reflective interlayer reflecting a first portion of the optical energy travelling through each individual one of said optical fibers of said first optical transmission cable and impinging on said interlayer into said individual associated optical fiber of said third optical transmission line, said semi-reflective interlayer transmitting a second portion of said energy travelling through each individual one of said optical fibers of said first optical transmission cable and impinging on said interlayer into said individual associated optical fiber of said second optical transmission cable.

2. The coupler defined in claim 1, wherein said interlayer includes a pellicle, said coupler further comprising index matching fluid immersing said pellicle and said end faces of said individual fibers of said first, second and third arrays for optically coupling said individual optical fibers to said pellicle.

3. The coupler defined in claim 1, wherein individual optical fibers of said first, second and third optical transmission cables each include a central core region having a predetermined geometry and a predetermined refractive index, said individual optical fibers further including a clad region having a refractive index lower than said predetermined refractive index of said core region, said surrounding clad region being beveled away at said end faces of said individual fibers such that said end faces substantially include said cross-sectional geometry of said core regions.

4. The coupler defined in claim 1, wherein said individual fibers include a central core region and a clad region coaxially surrounding said core region, said core region having a predetermined refractive index greater than the refractive index of said clad region, and wherein said interlayer includes a first layer of substantially transparent solid embedment material having a refractive index substantially equal to said predetermined refractive index of said core regions of said individual fibers, said first layer of said solid embedment material being formed on said planar surface of said first support body, said interlayer further including a second layer of said optically transparent solid embedment material formed on said planar face of said second support body, one of said first and second layers of said solid embedment material including a partially reflective coating to partially reflect optical energy propagating along said individual fibers of said first optical transmission cable to corresponding individual optical fibers of said third optical transmission cable while transmitting a predetermined portion of said energy propagating along said first optical transmission cable to the individual fibers of said second optical transmission cable.

5. The coupler defined in claim 1 wherein each of said first and second support bodies include a rectangular support block having a predetermined height and length, each of said first and second support bodies further including a first and second wedge-shaped support block having two mutually opposed right triangular faces, each of said right triangular faces having an altitude dimension substantially equal to said height dimension of said rectangular support block and a base dimension substantially equal to said length dimension of said rectangular support block, said first wedge-shaped support block of said first support body being joined to said rectangular support block of said first support body with the edges of said first wedge-shaped support block that define said base dimension of said mutually opposed right triangular faces being substantially coincident with mutually opposed edges of said rectangular support block that define said length dimension of said rectangular support block, said individual fibers of said first optical transmission cable being disposed between the interfacing surfaces of said rectangular support block and said first wedge-shaped support block, said second wedge-shaped support block of said first support body being joined to said rectangular support block of said first support body with the edges of said second wedge-shaped support block that define said altitude dimension of said mutually opposed right triangular faces being substantially coincident with mutually opposed edges of said rectangular support block that define said height dimension of said rectangular support block, said second wedge-shaped support block being arranged relative to said first wedge-shaped support block to orient the planar surfaces defined between the hypotenuses of said mutually opposed right triangular faces substantially coplanar with one another, said individual fibers of said third optical transmission cable being disposed between the interfacing surfaces of said rectangular support block and said second wedge-shaped support block, said first wedge-shaped support block of said second support body being joined to said rectangular support block of said second support body with the edges of said second wedge-shaped support block that define said base dimension of said mutually opposed right triangular faces being substantially coincident with mutually opposed edges of said rectangular support block that define said length dimension of said rectangular support block, said second wedge-shaped support block of said second support body being joined to said rectangular support block of said second support body with the edges of said second wedge-shaped support block that define said altitude dimension of said mutually opposed right triangular faces being substantially coincident with mutually opposed edges of said rectangular support block that define said height dimension of said rectangular support block, said second wedge-shaped support block being arranged relative to said first wedge-shaped support block to orient the planar surfaces defined between the hypotenuses of said mutually opposed right triangular faces substantially coplanar with one another, said individual fibers of said second optical transmission cable being disposed between the interfacing surfaces of said rectangular support block and said second wedge-shaped support block.

6. The coupler defined in claim 5 wherein at least the surfaces of said rectangular support blocks of said first and second support bodies that interface with surfaces of said first and second wedge-shaped support bodies include a plurality of substantially parallel grooves for receiving and containing said individual optical fibers of said first, second and third optical transmission cables.

7. Optical coupling apparatus for use in an optical transmission system for coupling a portion of the optical energy propagating through each individual optical fiber of a plurality of optical transmission paths into optical fibers individually associated with each of said optical transmission paths, said optical coupling apparatus comprising:

support means for receiving and containing said individual optical fibers of said plurality of optical transmission paths and said optical fibers individually associated with said optical transmission paths, said support means including a first plurality of openings passing through said support means for receiving said individual optical fibers of said plurality of optical transmission paths, said first plurality of openings being arranged in a plurality of rows with each opening within a particular row being coplanar with an opening within each other row of said openings, said support means including a second plurality of openings for receiving said optical fibers individually associated with said optical transmission paths, each opening of said second plurality of openings being coplanar with and intersecting a single individual opening of said first plurality of openings within the interior region of said support means, said first and second plurality of openings being arranged within said support means to position each intersection between a second opening and a first opening coincident with a common plane passing through said support means, said support means being severed along said common plane to divide said support means into two separate portions;

a semi-reflective interlayer of a thickness less than the thickness of each of said optical fibers of said plurality of optical transmission paths and less than the thickness of each of said optical fibers individually associated with each of said optical transmission paths, and semi-reflective interlayer being disposed along said common plane between said separate portions of said support means to span each of said intersections between a second opening and a first opening with said separate portions of said support means being joined together to unite said separate portions and said interlayer;

a first plurality of optical fibers, each optical fiber of said first plurality of optical fibers defining an input section of an individual one of said plurality of optical transmission paths, each of said optical fibers of said first plurality of optical fibers being fixedly retained in individual ones of said first openings of said support means with at least a portion of the terminus of each optical fiber in substantial abutment with said semi-reflective interlayer;

a second plurality of optical fibers, each optical fiber of said second plurality of optical fibers defining an output section of an individual one of said plurality of transmission paths, each of said optical fibers of said second plurality of optical fibers being fixedly retained in individual ones of said first openings of said support means with each of said optical fibers of said second plurality of optical fibers in substantial alignment with one of said optical fibers of said first plurality of optical fibers and with at least a portion of the terminus of each of said optical fibers of said second plurality of optical fibers in substantial abutment with said semi-reflective interlayer; and, a third plurality of optical fibers, each optical fiber of said third plurality of optical fibers defining a secondary output section for supplying a predetermined portion of the optical energy propagating from the terminus of an associated one of said optical fibers of said first plurality of optical fibers, each of said optical fibers of said third plurality of optical fibers being fixedly retained in individual ones of said second openings of said support means with a portion of the terminus of each of said optical fibers of said third plurality of optical fibers in substantial abutment with said semi-reflective interlayer and in substantial abutment with one of said optical fibers of such first plurality of optical fibers.

8. The optical coupling apparatus defined in claim 7 wherein said semi-reflective interlayer is a pellicle supported and retained coincident with said common plane of said support means, said pellicle having a predetermined reflection-transmission ratio to determine said predetermined portion of optical energy supplied by each of said optical fibers of said third plurality of optical fibers.

9. The optical coupling apparatus defined in claim 7 wherein said semi-reflective interlayer includes a partially reflective coating deposited on one of said separate portions of said support means coincident with said common plane of said support means.

* * * * *

UNITED STATES PATENT AND TRADEMARK OFFICE
CERTIFICATE OF CORRECTION

PATENT NO. : 4,130,345
DATED : December 19, 1978
INVENTOR(S) : O. Leonard Doellner It is certified that error appears in the above-identified patent and that said Letters Patent are hereby corrected as shown below:

Column 6, line 52, "structre" should be —structure—.

Column 9, line 19, "fiberr" should be —fiber—.

Column 10, line 48, "soley" should be —solely—.

Column 11, lines 38-39, delete "When a metallically coated pellicle coated as the pellicle 70 of FIGURE 3 is utilized," and insert therefor —When a metallically coated pellicle is utilized as the pellicle 70 of FIGURE 3,—.

Signed and Sealed this

Seventeenth Day of April 1979

[SEAL]

Attest:

RUTH C. MASON
Attesting Officer

DONALD W. BANNER
Commissioner of Patents and Trademarks